United States Patent [19]

Dela Cruz

[11] 4,204,334
[45] May 27, 1980

[54] PRECISION GRAVITY RESPONSIVE ANGLE INDICATOR

[76] Inventor: Luis B. Dela Cruz, 5325 Bonita Dr., San Diego, Calif. 92114

[21] Appl. No.: 949,125

[22] Filed: Oct. 6, 1978

[51] Int. Cl.² .................................................. G01C 9/12
[52] U.S. Cl. ........................................ 33/391; 33/369; 33/392; 33/401
[58] Field of Search ................ 33/391, 399, 401, 347, 33/389, 392, 369

[56] References Cited

U.S. PATENT DOCUMENTS

| | | | |
|---|---|---|---|
| 767,188 | 8/1904 | Warner | 33/369 |
| 2,541,880 | 2/1951 | McMillan et al. | 33/347 X |
| 2,596,422 | 5/1952 | Miller | 33/401 X |
| 2,611,189 | 9/1952 | Bello | 33/399 |
| 3,241,245 | 3/1966 | Levine | 33/401 X |
| 3,299,523 | 1/1967 | Lea | 33/347 X |
| 3,427,724 | 2/1969 | Tracy | 33/392 X |

FOREIGN PATENT DOCUMENTS

905692  12/1945  France ........................................ 33/401

*Primary Examiner*—Charles E. Phillips
*Attorney, Agent, or Firm*—Ralph S. Branscomb

[57] ABSTRACT

A precision level, plumb and angle indicating device responsive to static gravity which has a hollow square frame provided with substantially equal parallel planar surfaces arranged with permanent magnet blocks embedded within each corner for abutting against a horizontal or vertical plane of an object, particularly a machine tool, for determining and/or orienting angles of inclination, as well as establishing level or plumb references to as close a tolerance as one sixtieth of an angular degree(minute). A circular plate or disk and a disk ring with indicia or graduations and corresponding numerals, adjustably disposed within an annular frame selectively rotatable about an opening at the front of said hollow square frame, cooperates with indicating pointers operatively affixed on shafts centrally located within the aforementioned circular plate or disk with degree graduations, and said disk ring displays minute graduations. Said invention is operatively responsive to gravitational force belt on said weight through gears and shafts arrangement enclosed within a chamber of said hollow frame. A drop line incorporated with a plumb point are provided for checking vertical plumb, and an attachment is also provided for checking line level, that is, the level between two distant points.

7 Claims, 4 Drawing Figures

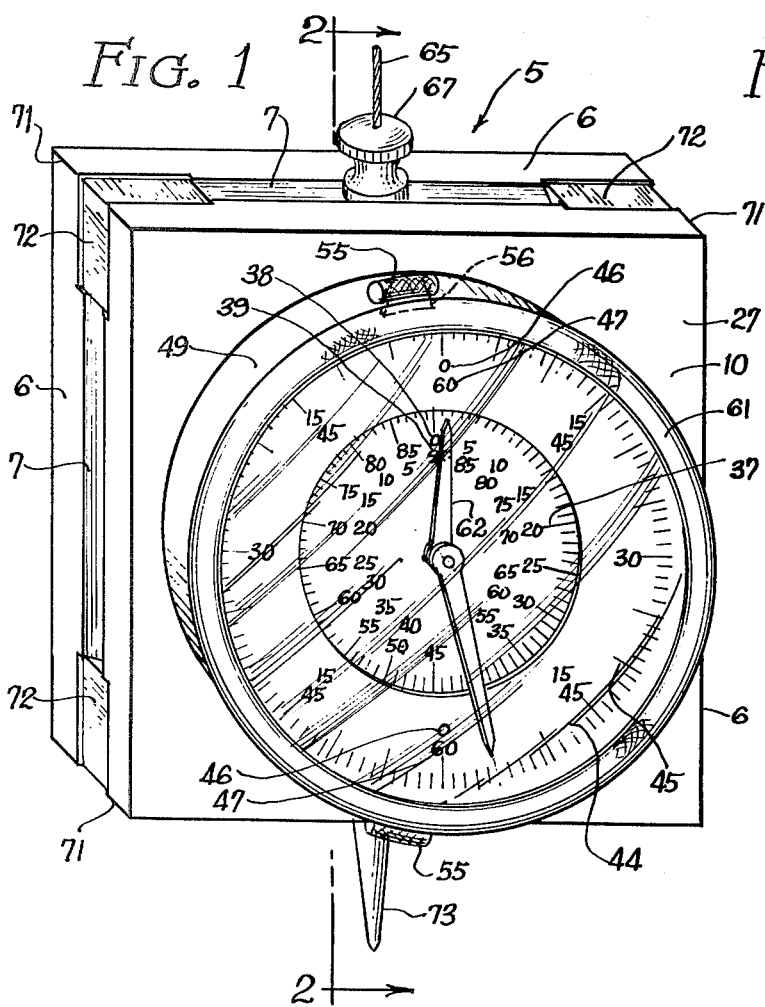
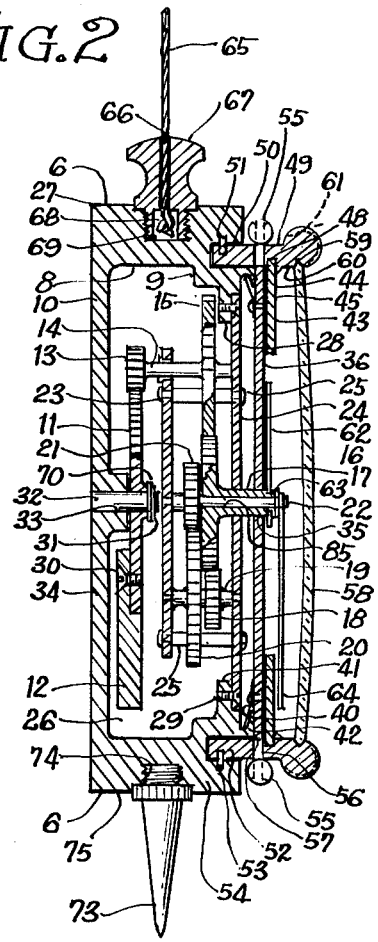
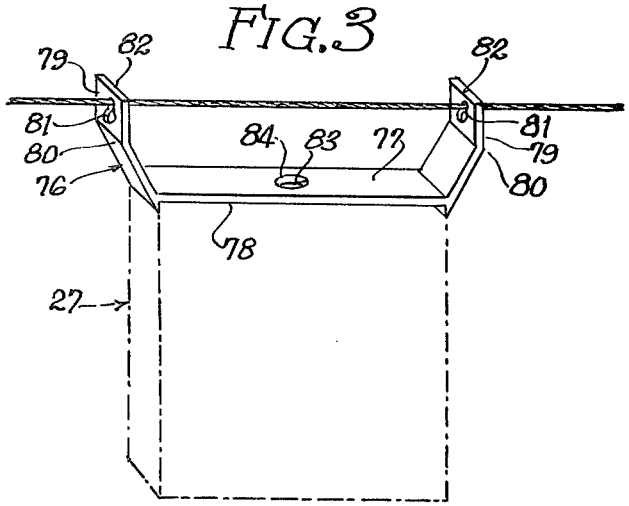
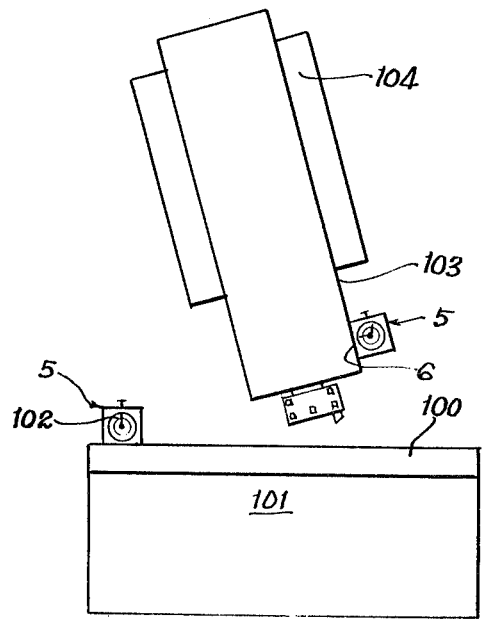

PRECISION GRAVITY RESPONSIVE ANGLE INDICATOR

BACKGROUND OF THE INVENTION

1. Field of Invention

This invention relates generally to an angle indicating device and particularly gravity responsive mechanical levels and, plumb and angle indicating devices which provide a visual angular indication in degrees when one plannar surface of the frame is held against a plane of an object or structure in construction and household use.

2. Description of the Prior Art 2,956,346  10/18/60 WHITE 33-215 U.S. Patent
3,854,218  12/17/74 COHEN 33-358 U.S. Patent
3,885,319  5/27/75 ROLLBAND 33-392 U.S. Patent
4,003,134  1/18/77 ADAMS 33-348 U.S. Patent.

Known mechanical angle and level indicating devices as set forth in the prior art listed above are non-adjustable, however, and must always be used from the same side of the frame of the device. In addition, at least one of the known devices employs a dial face with closely spaced graduations in degrees only. Other angle indicating device known in the art are provided with forty five degrees graduations only, disposed on an elongated frame.

3. Objects of the Present Invention

Accordingly, the main object of the present invention is to provide a more practical, improved and precise gravity responsive angle, level and plumb dial indicating device which obviates the defficiencies and inadequacies of known systems. An important object of this present invention is to provide a more efficient and precise gravity responsive angle indicating device that can be adjustably oriented and/or calibrated. A further important object of this present invention is to provide an extremely efficient and reliable precision gravity responsive angle indicating device that can be read to as close a tolerance as a of sixtieth of an angular degree. A further object of this invention is to provide an extremely versatile, efficient and precise gravity responsive angle, level and plumb indicating device that can be dependably utilized in manufacturing and industry such as in machine shops and the like, as well as in the construction industry and generally for household use. A still further and most important object of this present invention is to provide an extremely efficient, reliable, versatile and precise gravity responsive angle indicating device that is simple, time saving, and a device that will eliminate the use of time consuming sine bars or plates which are normally incorporated with angle plates, gage blocks and conventional dial indicators. This present invention can be most valuable when utilized in machine shops for setting up machine tools, for inspecting finished parts while still on the machine and also when performing final bench inspection in so far as angle, level and plumb or vertical squareness are concerned.

SUMMARY OF THE INVENTION

Broadly, this present invention comprises a hollow square frame of light weight material, preferably of heat treated aluminum or reinforced plastic material having four equal orthogonal plannar surfaces arranged for abutting against planar or cylindrical surfaces of an object, structure, machine tool or the like, to determine angles of inclination, and to level or plumb to a tolerance of one minute of a degree. An annular ring frame, provided with a transparent face cover, is rotatably disposed about an opening of said hollow square frame enclosing a circular plate or disk and a disk ring, with indicia or graduations in degrees, minutes and numerals, rotatably and selectively adjustably cooperating with indicating pointers. Said indicating pointers are firmly affixed and pivoted on shafts diposed within the center of said circular plate or disk, operatively responsive to gravity weight through gears and shafts arrangement within a chamber of said hollow frame. A plurality of sector block with permanent magnets, firmly affixed within corners of said hollow square frame for magnetic chucking thereof. A dropline affixed to an eyelet screw is demountably disposed on top of the hollow frame incorporating with a depending pointed plumb screw demountably disposed centrally on the lower planar surface for checking line level between two distant points.

BRIEF DESCRIPTION OF THE DRAWING

Other objects and advantages, and more complete understanding of the present invention will become apparent from consideration of the following specification and drawing in which:

FIG. 1 is a perspective view of the present invention showing the basic elements of the device such as the hollow quadratic frame; the dial face, dial pointers and dial frame; the degree circular plate or disk; friction adjusting plates; permanent magnet sector blocks; plumb dropline, eyelet screw and plumb pointed screw; etc..

FIG. 2 is a side elevation cross sectional view of the present invention through 2—2 of FIG. 1, showing the gravity drive or power gear and other gear and shaft arrangements. It also illustrates the different parts of the dial indicator assembly.

FIG. 3 is a perspective view of an attachment for horizontal line level.

FIG. 4 is an illustration of the present invention as applied on a vertical boring machine showing said angle indicating device being utilized on the vertical ram and table.

DESCRIPTION OF A PREFERRED EMBODIMENT

Referring now to FIGS. 1 and 2, there is illustrated a precision angle, plumb and level dial indicating device 5, an exemplary of one form of gravity responding angle indicating device which is operative to convert static gravity into mechanical energy necessary to rotate a power gear 11 with weight 12 to drive a set of gears and shafts 13, 14, 15, 16, 17, 18, 19, 20, 21 and 22 arranged with predetermined rotational ratio within framework plates 23 and 24 joined together by rivets or screws 25, detachably mounted within a chamber 26 enclosed by circumferential wall 8 adjacent to the four planar orthogonal surfaces 6 and defined by the front inner wall 9 adjacent to front outer wall 10 and rear inner wall and outer wall 34 of a hollow quadratic frame 27. Said framework plate 24 is mounted on an inner mating flange 28 by screws 29. Said weight 12 is affixed to said power gear 11 by screws 30 and said power gear 11 is rotatably retained by retaining ring 31 in combination with thin thrust washers 70 on pin 32 which is firmly affixed within aperture 33 centrally located in backwall 34. Said retaining ring 31 is retainingly disposed within a groove located in the protruding end of said pin 32. Said power gear 11 drives gear 13 and gear 15 through shaft 14, while gear 15 drives gear 16 to rotate a hollow shaft 17 protruding through the face of the indicator via an aperture 35 disposed centrally through circular plate or disk 36. Gear 16 drives gear 18 and 20 through shaft 19 while gear 20 drives gear 21 to rotate shaft 22 which is extendedly protruding through the front face via an aperture 85 located within the center or axis of hollow shaft 17. Said gear arrangement is provided with spiral spring (not shown) to eliminate gear backlash. Said circular plate or disk 36 is provided with indicia or graduations 37 located circumferentially about the mid section of its face. Said graduations represent angular degrees, preferably ninety, equally spaced graduations in one complete circle and include corresponding numerals that read clockwise or counterclockwise, 38 and 39 respectively. Said circular plate or disk 36 is flatly disposed on the front face of said hollow frame 27 adjustably retained by a plurality of spring retaining finger 40 the inner end of which is firmly affixed on the back side of said circular plate or disk 36, while the outer end of said spring retaining finger 40 is rotatably anchored or secured within the groove 42 disposed about the opening 41 of said hollow frame 27. A disk ring 43 is also provided with indicia or graduations on its circumferential extremity 44 representing minutes 45, preferably one hundred and twenty equally spaced graduations representing sixty minutes per one half circumferential turn which is equivalent to one degree or one hundred twenty minutes in one complete circumferential turn equivalent to two degrees and is also provided with corresponding numerals that read clockwise and counterclockwise 46 and 47. It will be noted in FIG. 1, said device 5 has a reading of 1 degree and 55 minutes on its dial. Said disc ring 43 is firmly attached within a groove 48 located within the inner rim of an annular frame 49. Said annular frame 49 is disposed rotatably adjustable within groove 50 circularly disposed around the front opening 41 of said hollow frame 27 and is held retainingly within said groove 50 with a scallop spring retaining ring 51 slidingly fitted within groove 52 disposed around the outside diameter of said annular frame 49, and groove 53 disposed within the outer wall 54 of said frontal groove 50. A pair of friction adjusting plate 55 opposedly disposed within slots 56 at the rim of said annular frame 49, which are directly in line with and finger pressed to activate against the outer rim 57 of said circular plate or disk 36 for degree selective adjustment. Said annular frame 49 is provided with transparent cover means 58, preferably clear plastic, mounted within groove 59 disposed within the inner wall of said aperture 60 of said circular or annular frame 49. The front peripheral surface of said annular frame 49 is provided with notches or knurlings 61 for better finger hold when making rotational adjustment of said disk ring 43. A short indicating pointer 62 transversely affixed on the extreme front end 63 of said hollow shaft 17 for degree indication while another longer indicating pointer 64 is transversely affixed on the extreme frontal end of the aforementioned shaft 22 for minute indication thereof. A drop line 65, one end of which is passed through an aperture 66 is centrally disposed within the axis of an eyelet screw 67. Said drop line 65 is provided with a knot 68 disposed within aperture 69. Said aperture 66 is somewhat larger than the diameter of the drop line 65 and the knot 68 is larger aperture 66, while aperture 69 is somewhat larger than said knot 68. Said eyelet screw 67 is demountably disposed medially on top of said hollow frame 27, while a depending pointed screw 73 is demountably affixed within aperture 74 disposed medially on the base 75 of said hollow frame 27 for checking vertical plumb. An attachment 76 as shown in FIG. 3 is provided for checking horizontal line level between two distant points. Said attachment 76, which is magnetically mounted on top of said hollow frame 27 comprises a flat bar 77, its base 78 is machinably prepared to suit the width and lenght of said hollow frame 27. The ends 79 of said attachment 76 are bent outwardly and upwardly to an angle and provided with keyhole shaped apertures 81 disposed at its extreme ends 82. An aperture 83, which is slightly larger than the diameter of the eyelet screw 67, is disposed medially 84 in the base 78 of said attachment 76. Said Hollow quadratic frame 27 has four equal parallel surfaces 6 machinably prepared with "V" groove 7 disposed along the center of its width for abutting any planar surface 6 to a plain or cylindrical surface of an object or structure. The corners 71 of said hollow frame 27 are provided with sector blocks 72 energized with permanent magnet.

IN OPERATION: (Illustrated in FIG. 4 as applied to vertical boring machine).

1. To check the squareness of the vertical head of a machine tool such as vertical boring machine or the like, in relation to its table, first place the present invention 5 uprightly on top 100 of the table 101 and set the indicator to zero reading 102 in degree and zero reading in minute by manipulating the annular frame 49. After setting, place said invention upright with one side of its planar surface abutting against a vertical plane of the vertical ram 103 of said vertical boring machine 104, re-orient or reset the vertical head to conform with zero indication of said present invention.
2. To set the vertical ram 103 to desired angular inclination, repeat operation 1 above and swivel the head of the machine to desired angle as directly indicated on the dial of the present invention.
3. For general household or construction use, the present invention may be utilized just like a conventional angle, level or plumb indicating device, that is, after the device is set to plumb zero before using.

It will be obvious to those skilled in the art to make changes, modifications and/or alterations as to shape, size and arrangements to said invention described herein without departing from the spirit of the intended invention or scope of the following claims:

I claim:
1. An angle indicator comprising:
   (a) a hollow rectangular frame defining planar orthogonal outer walls, an interior cavity, and a frontal circular opening providing access to said cavity;
   (b) an annular frame rotatably mounted to said rectangular frame over said frontal opening and mounting an annular scale display;
   (c) a first shaft rotatably mounted in said rectangular frame coaxial with the rotational axis of said annular frame and having a first needle registering with said scale display;
   (d) drive gear having a pendular weight mounted thereon rotatably mounted in said rectangular frame and including a gear train to drive said shaft from said drive gear in response to movement of said pendular weight; and (e) said rectangular frame having a front portion in which said frontal opening is defined, and said front portion defines an annular slot entered from the front thereof which is continuous around said opening, and said annular frame has an annular flange received within said slot and having retainer means holding said flange therein and permitting rotation of said annular frame in said slot.

2. The structure according to claim 1 wherein said rectangular frame has a front portion in which said frontal opening is defined, and said front portion defines an annular slot entered from the front thereof which is continuous around said opening, and said annular frame has an annular flange received within said slot and having retainer means holding said flange therein and permitting rotation of said annular frame in said slot.

3. The structure according to claim 1 wherein said retainer means comprises complementary facing grooves in the side of said annular slot and in said annular flange and a scallop spring extended along said grooves.

4. The structure according to claim 3 wherein said annular frame means is provided with transparent dial face cover means, said annular frame means is also provided with serrations disposed around its outer front periphery.

5. An angle indicator comprising:

(a) a hollow rectangular frame defining planar orthogonal outer walls, an interior cavity, and a frontal circular opening providing access to said cavity;

(b) an annular frame rotatably mounted to said rectangular frame over said frontal opening and mounting an annular scale display;

(c) a first shaft rotatably mounted in said rectangular frame coaxial with the rotational axis of said annular frame and having a first needle registering with said scale display;

(d) drive gear having a pendular weight mounted thereon rotatably mounted in said rectangular frame and including a gear train to drive said shaft from said drive gear in response to movement of said pendular weight;

(e) said rectangular frame having a front portion in which said frontal opening is defined, and said front portion defines an annular slot entered from the front thereof which is continuous around said opening, and said annular frame has an annular flange received within said slot and having retainer means holding said flange therein and permitting rotation of said annular frame in said slot; and (f) said annular frame including a circular disc provided with said scale display and said circular disc is provided with spring-retaining fingers integrally affixed on its back face, and said frontal cavity has an interior annular groove in which the free ends of said spring-retaining fingers are rotatably anchored.

6. The structure according to claim 5 wherein said annular scale display is provided on a disc and said disc is rotatably mounted in said annular frame, and including a plurality of finger-compresible friction plates penetrating said annular frame and engaging the edge of said disc to permit the rotative adjustment of same concomitantly with said annular frame.

7. The structure according to claim 5 wherein said first shaft is hollow and said second shaft passes through said first shaft.

* * * * *